United States Patent
McGee (10) Patent No.: US 6,450,149 B1
(45) Date of Patent: Sep. 17, 2002

(54) METHOD AND APPARATUS FOR CONTROLLING OVERLAP OF TWO FUEL SHOTS IN MULTI-SHOT FUEL INJECTION EVENTS

(75) Inventor: Brian G. McGee, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/616,121

(22) Filed: Jul. 13, 2000

(51) Int. Cl.$^7$ ............................. F02B 3/00; F02M 51/00
(52) U.S. Cl. ....................................... 123/480; 123/299
(58) Field of Search ................................ 123/357, 370, 123/371, 431, 436, 480, 492, 493, 299, 300, 446, 456

(56) References Cited

U.S. PATENT DOCUMENTS

| | | | | |
|---|---|---|---|---|
| 4,140,088 A | * | 2/1979 | De Vulpillieres | 123/478 |
| 4,545,355 A | * | 10/1985 | Takao et al. | 123/489 |

(List continued on next page.)

FOREIGN PATENT DOCUMENTS

| | | |
|---|---|---|
| EP | 0 221 832 A2 | 5/1987 |
| GB | 2193585 | 2/1988 |

OTHER PUBLICATIONS

SAE 2/24–27, 1997 A New Concept for Low Emission Diesel Combusion—Printed from Diesel Engine Combustion Processes and Emission Control Technologies (SP–1246).

Primary Examiner—Tony M. Argenbright
Assistant Examiner—Hai Huynh
(74) Attorney, Agent, or Firm—Blackwell, Sanders, Peper Martin (57) ABSTRACT

A fuel injection control system and method for controlling a potential overlap of two fuel shots in a particular fuel injection event for an engine. A controller is coupled to a plurality of fuel injection devices associated with the engine and is operable to determine a cylinder first shot duration value based upon a predetermined nominal first shot duration value and a predetermined cylinder first shot duration trim value. The controller is further operable to retrieve a first shot advance value and a minimum second shot delay value associated with the cylinder and thereafter determine whether a first fuel shot in the particular fuel injection event will overlap in some fashion with a second fuel shot in that same fuel injection event based upon the cylinder first shot duration value and the retrieved values. The controller is further operable to either remove a portion of the first fuel shot that overlaps into a predetermined region of the particular fuel injection event or set the first fuel shot duration time to zero if it determines that a potential overlap situation will occur. The controller is further operable to load the cylinder first shot duration time thus determined for each cylinder in a computer readable medium associated with the respective cylinder during each fuel injection event.

44 Claims, 3 Drawing Sheets

U.S. PATENT DOCUMENTS

| | | | |
|---|---|---|---|
| 4,571,683 A | | 2/1986 | Kobayashi et al. |
| 4,576,135 A | | 3/1986 | Johnson |
| 4,621,599 A | | 11/1986 | Igashira et al. |
| 4,704,999 A | | 11/1987 | Hashikawa et al. |
| 4,729,056 A | | 3/1988 | Edwards et al. |
| 4,782,803 A | * | 11/1988 | Kikuchi ...................... 123/300 |
| 4,836,161 A | | 6/1989 | Abthoff et al. |
| 4,922,878 A | | 5/1990 | Shinogle et al. |
| 5,020,979 A | | 6/1991 | Askew |
| 5,070,836 A | | 12/1991 | Wahl et al. |
| 5,113,833 A | | 5/1992 | Nagano et al. |
| 5,245,972 A | | 9/1993 | Denz et al. |
| 5,267,545 A | | 12/1993 | Kitson |
| 5,268,842 A | | 12/1993 | Martson et al. |
| 5,277,164 A | | 1/1994 | Takahashi et al. |
| 5,320,079 A | | 6/1994 | Kuwabara |
| 5,379,733 A | | 1/1995 | Haddick et al. |
| 5,402,760 A | * | 4/1995 | Takeuchi et al. ............ 123/300 |
| 5,427,072 A | | 6/1995 | Udo |
| 5,427,083 A | | 6/1995 | Ahern |
| 5,450,829 A | | 9/1995 | Beck |
| 5,460,128 A | | 10/1995 | Kruse |
| 5,492,098 A | | 2/1996 | Hafner et al. |
| 5,499,608 A | | 3/1996 | Meister et al. |
| 5,507,260 A | | 4/1996 | Hintzen |
| 5,540,205 A | | 7/1996 | Davis et al. |
| 5,549,092 A | | 8/1996 | Hasegawa |
| 5,566,650 A | | 10/1996 | Kruse |
| 5,566,660 A | | 10/1996 | Camplin et al. |
| 5,588,415 A | | 12/1996 | Ahern |
| 5,609,131 A | | 3/1997 | Gray, Jr. et al. |
| 5,615,654 A | * | 4/1997 | Weisman, II et al. ....... 123/350 |
| 5,634,448 A | | 6/1997 | Shinogle et al. |
| 5,647,317 A | | 7/1997 | Weisman, II et al. |
| 5,678,521 A | | 10/1997 | Thompson et al. |
| 5,685,273 A | | 11/1997 | Johnson et al. |
| 5,701,870 A | | 12/1997 | Gottshall et al. |
| 5,704,336 A | | 1/1998 | Wrobel |
| 5,722,373 A | | 3/1998 | Paul et al. |
| 5,732,680 A | | 3/1998 | Ninomiya et al. |
| 5,740,775 A | | 4/1998 | Suzuki et al. |
| 5,740,776 A | | 4/1998 | Enderle et al. |
| 5,746,183 A | | 5/1998 | Parke et al. |
| 5,778,850 A | | 7/1998 | Buratti et al. |
| 5,794,585 A | | 8/1998 | Yonezawa et al. |
| 5,803,049 A | | 9/1998 | Harcombe |
| 5,832,901 A | | 11/1998 | Yoshida et al. |
| 5,839,275 A | | 11/1998 | Hirota et al. |
| 5,865,153 A | | 2/1999 | Matsumoto |
| 5,865,158 A | | 2/1999 | Cleveland et al. |
| 5,893,347 A | | 4/1999 | McGee et al. |
| 5,924,403 A | * | 7/1999 | Thomas ...................... 123/300 |
| 5,979,398 A | | 11/1999 | Yanagihara |
| 5,979,412 A | | 11/1999 | Warner |
| 5,986,871 A | | 11/1999 | Forck et al. |
| 6,000,384 A | | 12/1999 | Brown et al. |
| 6,006,727 A | | 12/1999 | Katashiba et al. |
| 6,009,849 A | | 1/2000 | Yamamoto et al. |
| 6,014,956 A | | 1/2000 | Cowden et al. |
| 6,021,370 A | | 2/2000 | Bellinger et al. |
| 6,026,780 A | | 2/2000 | Barnes et al. |
| 6,032,642 A | | 3/2000 | Trumbower et al. |
| 6,044,824 A | | 4/2000 | Mamiya et al. |
| 6,067,954 A | * | 5/2000 | Kudou et al. ................ 123/299 |
| 6,082,331 A | * | 7/2000 | Barnes et al. ................ 123/446 |
| 6,085,730 A | * | 7/2000 | Coatesworth et al. ....... 123/480 |
| 6,325,041 B1 | * | 12/2001 | Mamiya et al. .............. 123/299 |
| 6,363,314 B1 | * | 3/2002 | Hafner et al. ................ 123/446 |

\* cited by examiner

METHOD AND APPARATUS FOR CONTROLLING OVERLAP OF TWO FUEL SHOTS IN MULTI-SHOT FUEL INJECTION EVENTS

TECHNICAL FIELD

This invention relates generally to fuel injection control signals and, more particularly, to a control system for handling an overlap of one fuel shot with another fuel shot in a multi-shot fuel injection event.

BACKGROUND ART

Electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of an injection signal received from an electronic controller. These signals include waveforms that are indicative of a desired injection rate as well as the desired timing and quantity of fuel to be injected into the cylinders.

Regulations pertaining to engine exhaust emissions are becoming increasingly restrictive throughout the world including, for example, restrictions on the emission of hydrocarbons, carbon monoxide, the release of particulates, and the release of oxides of nitrogen ($NO_x$). Tailoring the number of injections and the injection rate of fuel to a combustion chamber, as well as the quantity and timing of such fuel injections, is one way in which to control emissions of an engine and meet such emission standards. As a result, split or multiple fuel injection techniques have been utilized to modify the bum characteristics of the combustion process in an attempt to reduce emission and noise levels. Split or multiple injection typically involves splitting the total fuel delivery to the cylinder during a particular injection event into two or more separate fuel injections, such as a pilot injection, a main injection, and an anchor injection, which may each be referred to generally as a fuel shot. As used throughout this disclosure, an injection event is defined as the injections that occur in a cylinder during one cycle of the engine. For example, one cycle of a four stroke engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine. At different engine operating conditions, it may be necessary to use different injection strategies in order to achieve both desired engine operation and emissions control. However, at higher engine speeds the controllability of distinct fuel shots relative to each other in such multi-shot injection signals is more difficult because of issues associated with high engine speeds. For example, if higher engine speeds are not accounted for, the total time duration of the fuel injection signals decreases, whereby the time delay between the end of one fuel shot and the beginning of a subsequent fuel shot may decrease. At significantly high engine speeds, the time delay may decrease below a minimum acceptable level, and the fuel shots may occur to close to each other or may even overlap, which situations are disadvantageous to the performance, fuel efficiency, and emissions of the engine. Even with more advanced electronically controlled fuel injectors, during high speed engine operating conditions, it is sometimes difficult to accurately control the timing of fuel delivery associated with each fuel shot despite the use of electrical current control signals.

Accordingly, in a system wherein multiple fuel injections and different injection waveforms are achievable, it is desirable to control the delivery of individual fuel shots in each fuel injection event so as to minimize overall emissions and fuel consumption. Accordingly, the present invention is directed to overcoming one or more of the problems as set forth above.

DISCLOSURE OF THE INVENTION

In one aspect of the present invention, there is disclosed an electronically controlled fuel injection system capable of delivering fuel injection signals, including a plurality of fuel injection shots, to the cylinders of an internal combustion engine during a single fuel injection event. The system includes at least one fuel injection device associated with each cylinder and operable to deliver the fuel shots, and a controller operable to determine the total desired fuel quantity, timing, number of fuel injections in an injection event, and actual fuel quantities associated with each individual fuel shot.

In one embodiment of the present invention, the controller is operable to provide fuel injection events comprising three distinct fuel shots, namely a pilot shot, a main shot, and an anchor shot. Each fuel injection event corresponds to a particular cylinder in an engine. The controller is further operable to determine whether the first shot, or the pilot shot, maintains at least a minimum desirable distance in time ahead of the second or main shot. If the pilot shot does maintain such minimum desirable distance, then the controller sends an appropriate fuel injection signal to the injection device associated with the respective cylinder. On the other hand, if the pilot shot does not maintain such minimum desirable spacing or distance, then that portion of the pilot shot which overlaps into either the minimum desired spacing between the pilot and main fuel shots or into the main fuel shot itself is removed, or the pilot shot duration is set to zero.

BRIEF DESCRIPTION OF THE DRAWINGS

For a better understanding of the present invention, reference may be made to the accompanying drawings in which.

BEST MODE FOR CARRYING OUT THE INVENTION

Figure 1:
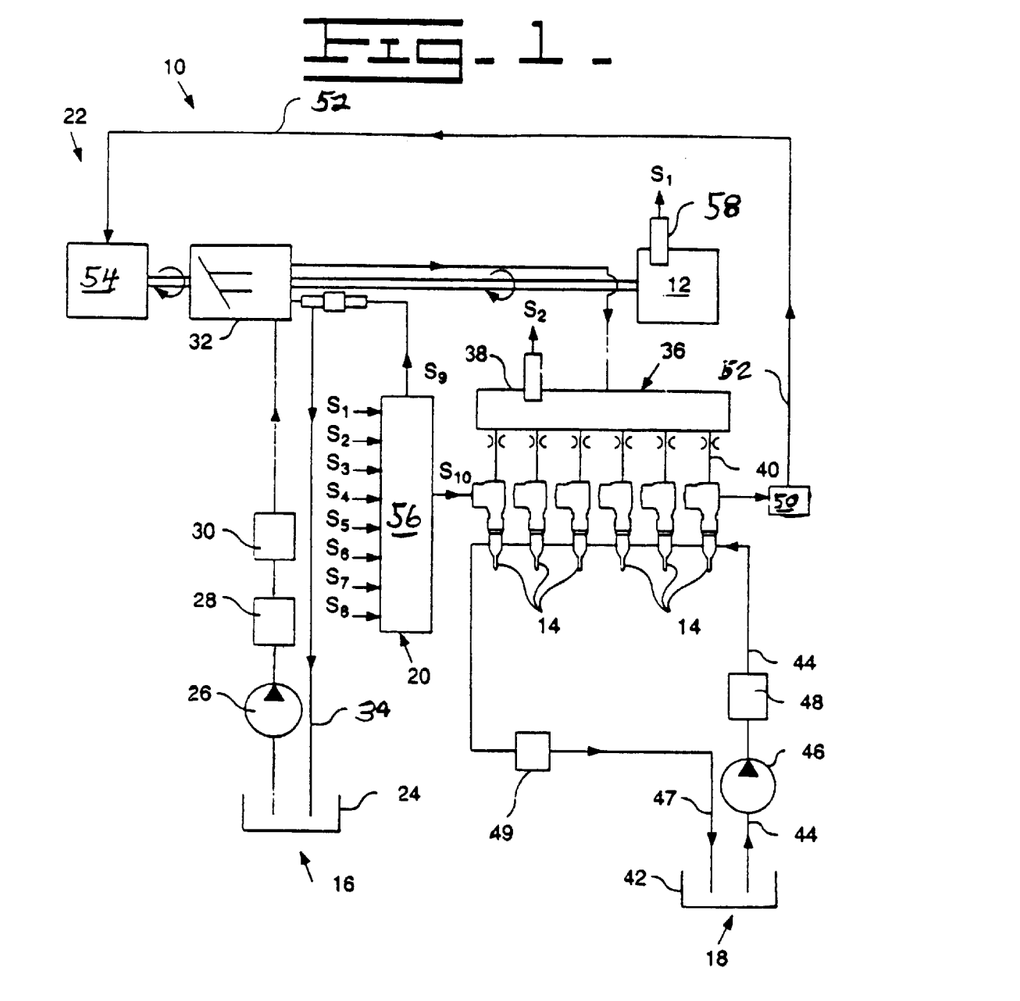
FIG. 1 is a typical schematic view of an electronically controlled fuel injector system used in connection with one embodiment of the present invention.

Referring to FIG. 1, there is shown one embodiment of a hydraulically actuated electronically controlled fuel injection system 10 in an exemplary configuration as adapted for a direct-injection compression ignition engine 12. Fuel system 10 includes one or more electronically controlled fuel injectors 14 which are adapted to be positioned in a respective cylinder head bore of the engine 12. While the embodiment of FIG. 1 applies to an in-line six cylinder engine, it is recognized and anticipated, and it is to be understood, that the present invention is also likewise applicable to other types of engines such as V-type engines and rotary engines, and that the engine may contain any plurality of cylinders or combustion chambers. In addition, while the embodiment of FIG. 1 also illustrates a hydraulically actuated electronically controlled fuel injector system, it is likewise recognized and anticipated that the present invention is also equally applicable to other types of injection devices, such as, electronically controlled injectors including mechanically actuated electronically controlled injector units as well as fluid activated common rail type fuel injection systems with digitally controlled fuel valves.

The fuel system 10 of FIG. 1 includes an apparatus or means 16 for supplying actuation fluid to each injector 14, an apparatus or means 18 for supplying fuel to each injector, electronic control means 20 for controlling the fuel injection system including the manner and frequency in which fuel is injected by the injectors 14 including timing, number of injections per injection event, fuel quantity per injection event, time delay between each injection, and the injection profile. The system may also include apparatus or means 22 for recirculating fluid and/or recovering hydraulic energy from the actuation fluid leaving each injector 14.

The actuating fluid supply means 16 preferably includes an actuating fluid sump or reservoir 24, a relatively low pressure actuating fluid transfer pump 26, an actuating fluid cooler 28, one or more actuation fluid filters 30, a high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high pressure common rail passage 38. In the case of a mechanically actuated electronically controlled injector, manifold 36, common rail passage 38 and branch passages 40 would typically be replaced with some type of cam actuating mechanism or other mechanical or electrical means for actuating such injectors. Examples of a mechanically actuated electronically controller fuel injector unit are disclosed in U.S. Pat. Nos. 5,947,380 and 5,407,131.

Apparatus 22 may include a waste accumulating fluid control valve 50 for each injector, a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering means 22. A portion of the recirculated actuation fluid is channeled to high pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel or some other type of liquid.

The fuel supply means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes an electronic control module (ECM) 56, also referred to as a controller, the general use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory is connected to the microcontroller or microprocessor and stores instruction sets, maps, lookup tables, variables, and more. ECM 56 may be used to control many aspects of fuel injection including (1) the fuel injection signal timing, including the individual timings of the distinct fuel shots in the fuel injection event, (2) the fuel injection quantity during an injection event, (3) the fuel injection pressure, (4) the number of separate injections or fuel shots during each injection event, (5) the time intervals between the separate injections or fuel shots, (6) the time duration of each injection event, (7) the fuel quantity associated with each injection or fuel shot, (8) the actuation fluid pressure, (9) current level of the injector waveform, and (10) any combination of the above parameters. Each of such parameters are variably controllable independent of engine speed and load. ECM 56 receives a plurality of sensor input signals $S_1$–$S_8$ which correspond to known sensor inputs such as engine operating conditions including engine speed, engine temperature, pressure of the actuation fluid, cylinder piston position and so forth that are used to determine the precise combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor 58 produces a signal designated by $S_1$ in FIG. 1 and is inputted to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuator.

Figure 2:
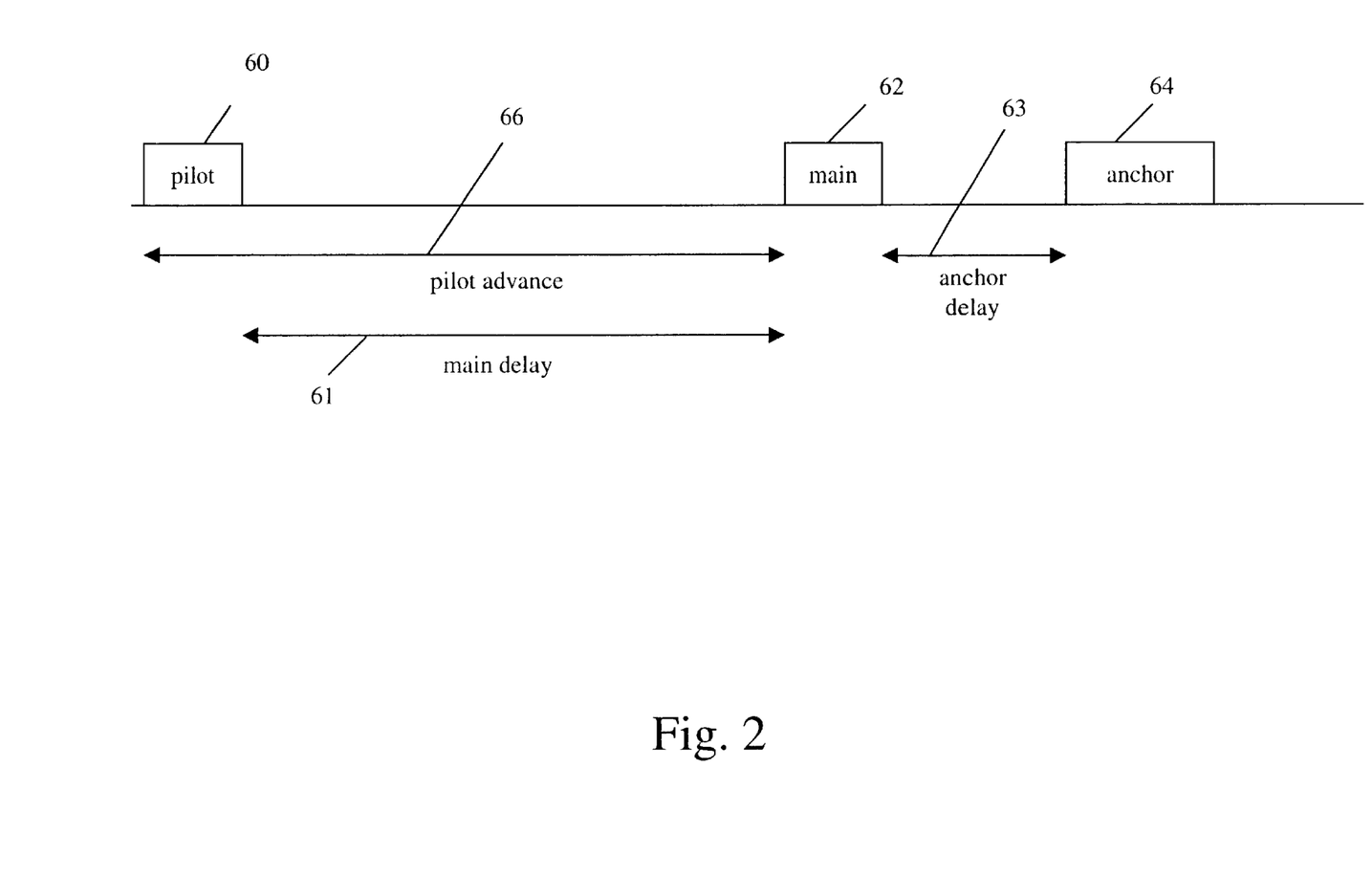
FIG. 2 is a schematic profile of a three shot fuel injection signal.

It is recognized that the type of fuel injection desired during any particular fuel injection event will typically vary depending upon various engine operating conditions. In an effort to improve emissions, it has been found that delivering multiple fuel injections to a particular cylinder during a fuel injection event at certain engine operating conditions achieves both desired engine operation as well as emissions control. FIG. 2 illustrates a multiple injection including three separate fuel injections, namely, a first fuel injection or pilot shot 60, a second fuel injection or main shot 62, and a third fuel injection or anchor shot 64. As illustrated in FIG. 2, the pilot shot 60 is injected into the combustion chamber in advance of the main shot 62 by some determined time factor, crank angle or main delay 61, and the anchor shot is sequenced after the main shot 62 based upon a determined time factor, crank angle or anchor delay 63. Based upon programming associated with electronic controller 56 as well as a variety of different maps and/or lookup tables stored within the memory of controller 56 including maps and/or tables relating to engine speed, engine load, the pressure associated with rail passage 38 (rail pressure), desired total fuel quantity and other parameters, controller 56 will be able to dynamically determine the total desired fuel quantity, the number of fuel shots, appropriate quantity of fuel required for each injection shot and partition the same accordingly, and it will be able to determine the timing and duration of each individual shot as well as the anchor delay 63. In the three shot multiple injection depicted in FIG. 2, a portion of the total fuel to be delivered to the combustion chamber will be injected by the first or pilot shot 60, a portion of such total fuel will be injected by the second or main shot 62, and a remaining portion of the total fuel to be injected will be injected by the third or anchor shot 64. Under some engine conditions, a three shot multiple fuel injection has advantages in terms of exhaust emissions, including reduced particulate emissions and/or reduced $NO_x$ emissions as well as achieving desired engine performance.

The present invention includes dynamically trimming out a portion of a fuel shot that overlaps into a predetermined region of a fuel injection signal in a fuel injection event. It is understood that the present invention will be associated with the overall fuel delivery or fuel injection process associated with a wide variety of different engines. In one embodiment, a fuel injection signal may be determined in response to the speed and load of an engine. For example, parameters associated with the operation of an engine such as engine speed and/or engine load may be established. Based upon these established conditions and appropriate predetermined maps and/or other calculations and/or variables, the total desired fuel quantity for a particular fuel injection event will be determined based upon the operating condition of the engine. In addition, based upon the total desired fuel quantity and other parameters associated with a particular injection event, the total number of desired fuel shots for the particular injection event will be determined as well as the desired fuel quantity for each fuel shot associated therewith. The fuel partitioning process will involve determining various parameters associated with each fuel shot such as the amount of fuel desired in each particular shot, the spacing between the respective shots, and other relevant parameters whereby a fuel injection waveform or fuel injection current signal may be determined. Once the number of fuel shots and the amount of fuel associated with each fuel shot is determined, one or more of the shots may be trimmed in accordance with the teachings of the present invention disclosed herein. A fuel injection signal indicative of the particular fuel shot parameters would then be determined and delivered to the fuel injection devices associated with the engine.

Referring to FIG. 2, the partitioning of a fuel injection signal into a first or pilot shot 60, a second or main shot 62, and a third or anchor shot 64 may be accomplished by establishing distinct start times for each shot relative to each other and/or relative to the piston position. It is typically desirable to have at least a minimum time delay (minimum main delay) between the end of the pilot shot and the beginning of the main shot, that is main delay 61, to achieve desired performance and emissions from engine 12. Likewise, it is preferable to separate the anchor shot from the main shot by a minimum time delay, that is minimum anchor delay 63, to achieve desired performance and emissions of engine 12. The time delays between the fuel shots, and therefore the starting time of each fuel shot, may be translated to an angular position of the crankshaft, with respect to a longitudinal axis thereof, during the respective fuel injection event. In one embodiment, such conversion of a time delay to an angular position at a particular engine speed is determined by the following formula:

Angle=time(ms)×6×engine speed(rpm).

Figure 3:
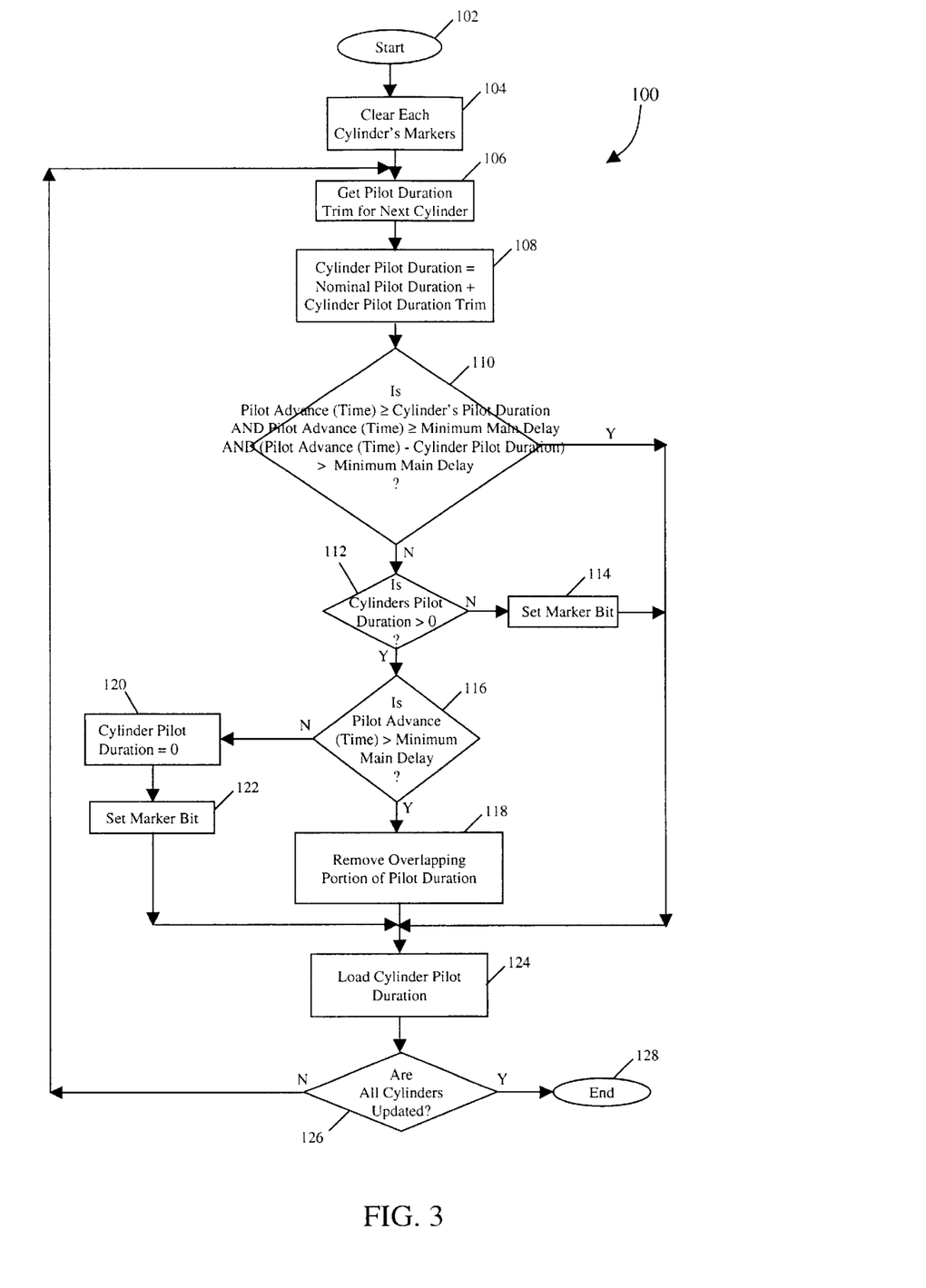
FIG. 3 is a schematic block diagram illustrating the operational steps for controlling an overlap condition of two fuel injection shots in a multi-shot fuel injection event.

Referring to FIG. 3, the determination of whether a first or pilot shot should be delivered in a particular fuel injection signal for fuel injector 14 is accomplished by the group of steps illustrated in a flowchart generally designated 100. Flowchart 100 is preferably stored as a software program on a computer readable medium such as memory or a data storage means associated with ECM 56. Further, ECM 56 is operable to generate signal $S_{10}$ for transmission to a fuel injector 14. In one embodiment, the transmission may be through a computer readable data transmission medium, which can be placed in communication with a diagnostic design display and input apparatus (not shown) including a display and keypad.

FIG. 3 is a flow chart illustrating one embodiment of the present invention. The flow chart describes determining whether a pilot shot should be trimmed. However, if, due to the current engine operating conditions, a pilot shot is not being utilized, the procedure may be skipped with regard to trimming of the pilot shot. However, the procedure may be applied to the next shot, example a main shot, when an anchor shot is being utilized. That is the procedure is applicable to determining whether any shot should be trimmed in light of its relationship with a subsequent shot.

In an initial step, the parameters of the method are re-set. At step 104, in one embodiment computer readable markers, or bits, associated with each cylinder in engine 12 are cleared or reset. In one embodiment, the markers will have one of two possible states, either set or unset. In the preferred embodiment, a set condition of a cylinder's marker is indicative of no pilot shot 60 for the corresponding fuel injection event, while an unset condition indicates that the corresponding fuel injection event shall have a pilot shot. Those skilled in the art will appreciate that the markers are reset, or cleared, at the outset of each execution of the steps of flowchart 100, whereby a desirable set condition may be subsequently effectuated for those cylinders that are not desired to have a pilot shot during the respective fuel injection event.

Once the procedure is initialized, the ECM establishes the duration of the pilot shot. In one embodiment, a nominal pilot duration is determined that corresponds to the time duration associated with the amount of fuel to be delivered in the corresponding fuel shot. In one embodiment, if a pilot shot is to be used, the nominal value may be determined utilizing a lookup map. In an alternative embodiment, including when mechanically actuated electronically controlled actuators are utilized, the nominal pilot shot value may be determined using mathematical equations. In the preferred embodiment, the nominal pilot shot is supplemented with a pilot duration trim value. Therefore, at step 106, ECM 56 selects a cylinder in engine 12 and preferably retrieves a pilot (first shot) duration trim value therefor. The pilot duration trim value is desirable for trimming out any differences in the fuel delivery performance (per unit of time) of the respective fuel injector. Such differences or tolerances may be inherently present in a fuel injector, or they may arise during the manufacturing process thereof. It is anticipated that typically such value for a fuel injector will be determined at the production plant in an end-of-line testing procedure therefor. It is, however, recognized and anticipated that this step of the preferred embodiment is not necessary for the practice of the present invention.

Engine 12, as discussed, will typically have a plurality of cylinders therein, and the sequence of combustion within the cylinders may be selected or predetermined in any one of the various sequences used in the art. For example, in one embodiment of the present invention, the predetermined sequence of cylinder firings in a six cylinder engine may be as follows:

Cyl 1-cyl 5-cyl 3-cyl 6-cyl 2-cyl 4.

However, it is recognized and anticipated that such sequence will typically depend upon a particular embodiment of the present invention. The pilot duration trim value for each cylinder may be a predetermined value stored in a memory or data storage means associated with electronic control means 20, and is accessible by ECM 56 at step 106. It is recognized and anticipated that the value may also be predetermined and programmed in software associated with ECM 56, or such value may be a configurable parameter whereby the pilot duration trim value of each cylinder may be individually modifiable by an operator or a technician as desired, or determined dynamically during the operation of the engine. In all such embodiments, however, it is preferable that the pilot duration trim value for the selected cylinder is available to ECM 56 at step 106.

Upon selecting a cylinder and retrieving its pilot duration trim value at step 106, ECM 56 calculates a pilot (first shot) duration value for that cylinder at step 108 by the formula:

Cylinder Pilot Duration=Nominal Pilot Duration+Cylinder Pilot Duration Trim

The pilot duration trim value for the cylinder was retrieved at step 106, and is therefore available to ECM 56 at step 108. The nominal pilot (first shot) duration value, however, is value which is determined based on the current operating conditions of the engine 12, and is preferably available to ECM 56 at step 108.

At step 110, ECM 56 determines whether the determined spacing between two injections, e.g., the pilot and main shots, is equal to or exceeds a desirable spacing. For example, in one embodiment, the expected main delay may be determined and compared to the desired main delay. If the expected main delay is less than the desired main delay, then the pilot shot, or first injection, needs to be trimmed. In the preferred embodiment, at step 110, the ECM 56 evaluates three conditions associated with the injection timing and determines whether all three conditions are true. The first condition evaluated is whether a pilot (first shot) advance value for the cylinder is greater than or equal to the cylinder's pilot (first shot) duration value calculated at step 108. The pilot advance value is preferably a predetermined value calculated or determined by other programming associated with ECM 56, and such predetermined value is preferably available to ECM 56 at step 110. The pilot advance value essentially corresponds to the time difference between the leading edges of pilot shot 60 and main shot 62, as best shown in FIG. 2. Accordingly, ECM 56 can evaluate whether the aforementioned first condition is true because it will have both values available thereto at step 110. If this first condition is not true, then ECM 56 simply proceeds to step 112, to trim the pilot shot accordingly. On the other hand, if this first condition is true, then ECM 56 evaluates the second condition.

The second condition evaluated by ECM 56 at step 110 is whether the cylinder's pilot (first shot) advance value is greater than or equal to a minimum main (second shot) delay value for the cylinder. Main delay 61 is depicted in FIG. 2, and the minimum main delay value is a predetermined configurable value indicative of a minimum amount of time desired between the end of the pilot shot and the commencement of the main shot in the cylinder of engine 12. The value of the minimum main delay is preferably predetermined and stored in a computer readable medium or software program associated with ECM 56. The value is typically determined experimentally by engineers and/or technicians, and is typically the same for all cylinders of identical types of engines. The pilot advance value, as discussed above, is also available to ECM 56 at step 110. Accordingly, ECM 56 may evaluate the second condition at step 110. If this second condition is not true, then ECM 56 simply proceeds to step 112, to trim the pilot shot accordingly. On the other hand, if this second condition is true, then ECM 56 evaluates the third condition at step 110.

The third condition evaluated by ECM 56 at step 110 is whether the difference between the pilot (first shot) advance value and the cylinder's pilot (first shot) duration value is greater than the minimum main (second shot) delay value. In essence, this condition involves comparing an established main delay with a desired main delay, and trimming the pilot shot when the established main delay is less than desired. Each of the pilot advance value, the cylinder's pilot duration value, and the minimum main delay value are available to ECM 56 at step 110 as discussed above. Therefore, ECM 56 may evaluate this condition at step 110, and if this condition is also true then ECM 56 proceeds to step 124. On the other hand, if this third condition is not true, ECM 56 proceeds to step 112. It is recognized and anticipated that in one embodiment of the present invention, the second condition in step 110 discussed above may omitted because the third condition will inherently take into account the second condition.

Those skilled in the art will appreciate that ECM 56 will proceed to step 112 if at least one of the three conditions evaluated at step 110 is not true. In other words, ECM 56 will reach step 112 if either the pilot advance time 66 is less than the pilot shot's duration, whereby the pilot shot 60 will overlap into the minimum desired spacing between the pilot shot 60 and the main shot 62 (this condition is also referred to as an overlap situation), and will overlap the main shot itself; or the pilot advance time 66 is less than the minimum main delay 61 permitted therefor, whereby the pilot shot 60 will overlap into the minimum desired spacing between the pilot shot 60 and the main shot 62; or the pilot advance time 66 minus the cylinder's pilot duration is less than the minimum main delay allowed, whereby the pilot shot 60 will overlap into the minimum desired spacing between the pilot shot 60 and the main shot 62. In other words, ECM 56 will reach step 112 if there is an indication from at least one of the three conditions evaluated that (1) pilot shot 60 either overlaps directly or may overlap with main shot 62 by some amount, or (2) main delay 61 is less than the minimum main delay desired. In one embodiment, the ECM 56 may determine whether the cylinder's pilot duration determined at step 108 is greater than zero at step 112, if this determination has not already been made. If the cylinder's pilot duration is not greater than zero, the condition would indicate that there is no pilot shot in the respective fuel injection event and no trimming of the pilot shot is necessary. In such event, ECM 56 proceeds to step 114, wherein it sets the marker bit associated with the cylinder selected at step 106, and then ECM 56 proceeds to step 124. As previously discussed, setting a cylinder's marker bit indicates that the cylinder will not have a pilot or first shot during the respective fuel injection event. On the other hand, if the cylinder's pilot duration is indeed greater than zero at step 112, then the condition would indicate that there is at least some time value associated with pilot shot 60, which means that there is a pilot or first shot in the respective fuel injection event. In such event, ECM proceeds to step 116.

A determination is now made with regard to how to trim the pilot shot. At step 116, ECM 56 determines whether the pilot (first shot) advance value is greater than the minimum main (second shot) delay value. This condition was previously evaluated at step 110, and as discussed above, the values for both will be available to ECM 56. If at step 116 the pilot advance value is indeed greater than the minimum main delay desired, then ECM 56 proceeds to step 118, and removes that portion of the pilot shot that undesirably overlaps into a predetermined region of the overall fuel injection event, such as overlaps into a portion of the minimum main delay and/or the main shot 62. In one embodiment of the present invention, this is achieved by subtracting the pilot advance time 66 value from the minimum main delay value, whereby the resulting value would effectively be the duration of pilot shot 60 with the undesirable portion thereof trimmed away. However, it is recognized and anticipated that trimming of the overlapping portion of the pilot duration may be accomplished in other ways. Upon removing the overlapping portion of the pilot duration, ECM 56 proceeds to step 124. Trimming or removing a portion of the pilot duration equates to not delivering a portion of the desired amount of fuel allocated to the pilot shot. Based upon programming associated with ECM 56, under certain circumstances, the amount of fuel trimmed or removed from the pilot shot may be added back into that particular fuel injection event by adding such trimmed pilot fuel back into a subsequent fuel shot in that particular injection event such as into the main and/or anchor fuel shots.

On the other hand, if the pilot advance value is not greater than the minimum main delay value at step 116, then the pilot shot is eliminated. This may be accomplished by the ECM 56 setting the cylinder's pilot duration value to zero at step 120. Those skilled in the art will appreciate that this step serves to eliminate the pilot or first shot in the respective fuel injection event, and this is desirable because the pilot advance value is inadequate for the respective fuel injection event since it is less than the minimum main delay 61 value desired, meaning the entire pilot shot would occur in an undesired region. In such event, ECM 56 then proceeds to step 122 where it sets the marker bit associated with the cylinder selected at step 106. As discussed above, setting the marker bit of the selected cylinder indicates that the cylinder will not have a pilot or first shot 60 in the respective fuel injection event. Upon setting the marker bit at step 122, ECM 56 proceeds to step 124.

At step 124, ECM 56 is operable to load the cylinder's pilot (first shot) duration, as determined by the steps discussed herein above, in a register, an array, or another computer readable medium associated with the cylinder selected at step 106. It is recognized that the cylinder pilot duration may be zero, as determined or set by steps 112 or 120, or the duration may be a value with a portion thereof truncated to remove any overlap with main shot 62 or main delay 61 as determined at step 122, or the duration may be the value determined at step 108. Upon loading this pilot duration value at step 124, this value is preferably accessible by electronic control means 20, ECM 56, or any other electronic controller or electromechanical means or other device operable to control the delivery of fuel to the cylinder during the respective fuel injection event. Upon loading the cylinder's pilot duration value at step 124, ECM 56 proceeds to step 126.

At step 126, ECM 56 determines whether the pilot duration values have been updated for all cylinders in engine 12 for the respective fuel injection event. If all cylinders have been updated with new pilot duration values at step 126, ECM 56 proceeds to step 128 and execution is terminated. On the other hand, if all cylinders have not been updated at step 126, ECM 56 returns to step 106 and selects the next cylinder in engine 12, and the steps discussed above, namely steps 106 through 124, are repeated for that cylinder. Flowchart 100 will be repeated continuously or based upon a predetermined repeat interval so that ECM 56 can determine and load each cylinder's pilot duration for each fuel injection event.

Although Flowchart 100 describes controlling an overlap situation between the pilot and main shots, it is also recognized that the steps of flowchart 100 are equally applicable for dynamically preventing an overlap situation between any two fuel shot injection signals such as between the main and anchor shots and even possibly between the pilot and anchor shots when no main shot is used.

INDUSTRIAL APPLICABILITY

As described herein, the present apparatus and method has particular utility in all types of engines, such as engines utilized in vehicles, work machines, marine vessels, electrical generators, stationary engines, and the like. The present apparatus and method, therefore, provides a control system and method for handling an overlap of two fuel shots in multi-shot fuel injection events for an engine at all engine speeds. It is anticipated that particular fuel injection shots, such as pilot shot 60, may be trimmed or removed from a fuel injection event of engine 12 at higher engine speeds, whereas all shots of fuel may be delivered at comparatively lower engine speeds because adequate time would be available in each fuel injection event to accommodate all three fuel shots. It is recognized that the present method and apparatus is likewise applicable to any two fuel shots that may overlap in a fuel injection event, including an overlap between the main and anchor fuel shots and, under certain circumstances, between the pilot and anchor shots.

In one embodiment, an injection signal is determined in response to the current engine speed and load. A map or lookup table may be used to determine the desired number of fuel shots, and the associated quantity, duration, and timing of the shots of the injection signal. However, depending on the resolution of the map or lookup table, the desired parameters may be determined by interpolating the values contained in the map or lookup table. These interpolated values may then need to be verified before injection occurs to ensure that the desired spacing occurs between any two injections. For example, there may be regions of the map, or lookup table where a transition occurs between two and three shots. If the current engine conditions result in parameters that lay in the transitional regions, then the resulting parameters need to be verified to determine if there is, for example, the desired spacing between the pilot and main shot. If the desired spacing is not obtainable, then the pilot should will be trimmed accordingly.

Those skilled in the art will appreciate that a complete execution of the steps of flowchart 100 will update and load the pilot shot duration values for each cylinder in engine 12 for one fuel injection event. Such pilot shot duration values will provide the respective start of the fuel injection event for that particular cylinder and the total duration thereof. The appropriate number of fuel injection shots having the desired amount of fuel associated therewith may accordingly be delivered to each cylinder. ECM 56 can perform the steps of flowchart 100 in a continuous loop, and thus determine the cylinder pilot duration for the fuel injection events for each cylinder for each fuel injection event.

It is recognized and anticipated that the specific threshold values, the time periods of engine speed monitoring by ECM 56, and the like, are preferably pre-programmed into ECM 56. Such values may be available in maps or tables stored in a memory means or data storage means associated with ECM 56. Alternatively, it is recognized that such values may be determined by appropriate formulas or mathematical computations to be performed by ECM 56 incorporated in the loop of flowchart 100, or at fixed time intervals. Accordingly, it is recognized and anticipated that ECM 56 may perform such steps in any one of the various ways known in the art.

It is preferred that the steps of flowchart 100, including the multiple execution of the loop formed by steps 106 through 126 (which occurs once for each cylinder in engine 12 for each fuel injection event) be repeated for each fuel injection event for the entire duration of operation of the engine. The interval between each such execution will typically be a function of the engine's current speed, but it is recognized and anticipated that such interval can be a predetermined time value, such as 15 microseconds for example, or such interval can be based upon some other relevant parameter or other predetermined criteria. Accordingly, it is intended that the claims will cover all such embodiments of the present invention that do not depart from the spirit and scope of the present invention.

It is likewise recognized and anticipated that variations to the operating steps depicted in flowchart 100 of FIG. 3 could be made without departing from the spirit and scope of the present invention. In particular, steps could be added or some steps could be eliminated. All such variations are likewise intended to be covered by the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A fuel injection control system for controlling fuel injection shots in a multi-shot fuel injection event comprising:
   at least one cylinder;
   at least one fuel injection device operable to deliver a plurality of fuel injection shots to said at least one cylinder during the fuel injection event;
   a controller coupled to said at least one fuel injection device and operable to determine a desired amount of fuel and the time duration for each of said plurality of fuel injection shots;
   said controller being operable to establish a predetermined nominal first shot duration value, a predetermined first shot advance value, and a predetermined minimum second shot delay value associated with said at least one fuel injection device and said at least one cylinder;
   said controller being operable to determine whether a first fuel shot in said fuel injection event needs to be trimmed based upon said nominal first shot duration value, said first shot advance value, and said minimum second shot delay value; and
   said controller being operable to modify the time duration of said first fuel shot if said controller determines that said first fuel shot needs to be trimmed.

2. The fuel injection control system as set forth in claim 1 wherein said controller is operable to establish a predetermined first shot duration trim value, said controller being further operable to determine whether a first fuel shot in said fuel injection event needs to be further trimmed based upon said first shot duration trim value.

3. The fuel injection control system as set forth in claim 2 wherein said controller is operable to set a marker bit associated with said at least one cylinder if the sum of said nominal first shot duration value and said cylinder first shot duration trim value is not greater than zero.

4. The fuel injection control system as set forth in claim 2 wherein said controller is operable to determine a cylinder first shot duration value for said at least one cylinder by adding said nominal first shot duration value and said cylinder first shot duration trim value, said controller being operable to leave the cylinder first shot duration value unchanged if said first shot advance value is greater than or equal to said determined cylinder first shot duration value, and said first shot advance value is greater than or equal to said minimum second shot delay value, and a difference between said first shot advance value and said determined cylinder first shot duration value is greater than said minimum second shot delay value.

5. The fuel injection control system as set forth in claim 1 including a computer readable medium associated with said at least one cylinder and coupled to said controller, said controller being operable to output a signal indicative of said time duration of said first fuel shot to said computer readable medium.

6. The fuel injection control system as set forth in claim 1 wherein said controller is operable to set a marker bit associated with said at least one cylinder if said first shot advance value is not greater than said minimum second shot delay value.

7. The fuel injection control system as set forth in claim 1 wherein said controller is operable to set a cylinder first shot duration value to zero if said first shot advance value is not greater than said minimum second shot delay value.

8. The fuel injection control system as set forth in claim 1 wherein said controller is operable to trim said first fuel shot by removing a portion of said first fuel shot that overlaps into a predetermined region of said fuel injection event.

9. The fuel injection control system as set forth in claim 8 wherein said controller is operable to add the trimmed portion of said first fuel shot that overlaps into a predetermined region of said fuel injection event into one or more fuel shots associated with said fuel injection event.

10. The fuel injection control system as set forth in claim 1 wherein said fuel injection event includes at least a pilot shot and a main shot, said first fuel shot being said pilot shot and said second fuel shot being said main shot.

11. The fuel injection control system as set forth in claim 10 wherein said fuel injection event also includes an anchor shot.

12. A computer readable medium containing instructions for controlling a fuel injection control system for controlling fuel shots in a multi-shot fuel injection event for an engine comprising:
    selecting one cylinder in the engine;
    establishing a nominal first shot duration value, a first shot advance value, and a minimum second shot delay value associated with said selected cylinder;

determining whether a first fuel shot in said fuel injection
event needs to be trimmed based upon said established
values; and modifying a time duration associated with said first fuel
shot if it is determined that said first fuel shot needs to
be trimmed.

13. The computer readable medium as set forth in claim
12 including retrieving a first shot duration trim value, and
determining whether said first fuel shot needs to be trimmed
further based upon said established first shot duration trim
value.

14. The computer readable medium as set forth in claim
12 including outputting a signal indicative of the time
duration associated with said first fuel shot.

15. The computer readable medium as set forth in claim
14 including updating a second computer readable medium
associated with said selected cylinder with said time duration indicated by said output signal.

16. The computer readable medium as set forth in claim
13 further comprising determining a cylinder first shot
duration value by adding said nominal first shot duration
value and said cylinder first shot duration trim value.

17. The computer readable medium as set forth in claim
12 further comprising:

determining if said cylinder first shot duration value is
greater than zero; and setting a marker bit associated with said selected cylinder
if said cylinder first shot duration is not greater than
zero.

18. The computer readable medium as set forth in claim
12 further comprising:

determining if said first shot advance value is greater than
said minimum second shot delay value; and setting a marker bit associated with said selected cylinder
if said first shot advance value is not greater than said
minimum second shot delay value.

19. The computer readable medium as set forth in claim
18 further comprising setting said cylinder first shot duration
value to zero if said first shot advance value is not greater
than said minimum second shot delay value.

20. The computer readable medium as set forth in claim
12 further comprising:

determining if said cylinder first shot duration value is
greater than zero;

determining if said first shot advance value is greater than
said minimum second shot delay value; and removing a portion of said first fuel shot that overlaps into
a predetermined region of the fuel injection event if
said cylinder first shot duration value is greater than
zero and said first shot advance value is greater than
said minimum second shot delay value.

21. A method for controlling a fuel injection event for a
cylinder located in an engine comprising the steps of:

establishing a first shot duration value, a first shot advance
value, and a minimum delay value for the injection
event;

determining whether a first fuel shot in said fuel injection
event needs to be trimmed based upon whether said
first shot advance value is greater than or equal to said
first shot duration value, whether said first shot advance
value is greater than or equal to said minimum second
shot delay value, and whether the difference between
said first shot advance value and said cylinder first shot
duration value is greater than said minimum second
shot delay value; and modifying a time duration associated with said first fuel
shot if it is determined that said first fuel shot needs to
be trimmed.

22. The method as set forth in claim 21 wherein the step
of establishing a first shot duration value further comprises
the steps of:

establishing a first shot duration trim value;

establishing a nominal first shot duration value; and determining said cylinder first shot duration value based
further upon said established first shot duration trim
value and said established nominal first shot duration
value.

23. The method as set forth in claim 21 further including
the step of setting a marker bit associated with said selected
cylinder if said cylinder first shot duration value is not
greater than zero, or if said first shot advance value is not
greater than said minimum second shot delay value.

24. The method as set forth in claim 22 wherein said step
of determining said cylinder first shot duration value
includes adding said nominal first shot duration value and
said cylinder first shot duration trim value.

25. The method as set forth in claim 21 further including
the step of outputting a signal indicative of the time duration
associated with said first fuel shot.

26. The method as set forth in claim 21 further including
the steps of:

determining if said cylinder first shot duration value is
greater than zero;

determining if said first shot advance value is greater than
said minimum second shot delay value; and removing a portion of said first fuel shot that overlaps into
a predetermined region of the fuel injection event if
said cylinder first shot duration value is greater than
zero and said first shot advance value is greater than
said minimum second shot delay value.

27. The method as set forth in claim 21 further including
the step of setting said cylinder first shot duration value to
zero if said first shot advance value is not greater than said
minimum second shot delay value.

28. The method as set forth in claim 21 further including
the step of updating a computer readable medium associated
with said selected cylinder with said time duration value
associated with said first fuel shot.

29. The method as set forth in claim 21 wherein said fuel
injection event includes at least a pilot shot and a main shot,
said first fuel shot being said pilot shot and said second fuel
shot being said main shot.

30. The method as set forth in claim 29 wherein said fuel
injection event also includes an anchor shot.

31. A fuel injection control system for controlling shots in
a fuel injection event for an engine comprising:

a controller operable to determine a speed of the engine;

said controller being further operable to determine an
initial fuel injection event based upon said determined
speed, said initial fuel injection event having a first
shot, a second shot, and a delay between said first and
second shots;

said controller being further operable to establish a
desired minimum delay between said first and second
shots based on said determined speed of the engine;

said controller being further operable to compare said
desired minimum delay with said determined initial
delay between said first and second shots; and said controller being further operable to modify said
initial fuel injection event based upon said comparison between said desired minimum delay and said determined initial delay between said first and second shots.

32. The fuel injection control system as set forth in claim 31 including:
at least one cylinder in said engine;
a computer readable medium associated with said at least one cylinder and coupled to said controller,
said controller being operable to output a signal indicative of a fuel injection event to said computer readable medium based upon said modified initial fuel injection event.

33. The fuel injection control system as set forth in claim 31 further comprising a marker bit associated with said at least one cylinder, said controller being operable to set said marker bit based upon said modified initial fuel injection event.

34. The fuel injection control system as set forth in claim 31 wherein said controller is operable to set said marker bit if said initial delay between said first and second shots is less than said desired minimum delay.

35. The fuel injection control system as set forth in claim 31 wherein said controller modifies said initial fuel injection event by removing a portion of said first fuel shot that overlaps into a predetermined region of the fuel injection event.

36. The fuel injection control system as set forth in claim 31 wherein said controller is operable to determine a cylinder first shot duration value for said at least one cylinder by adding a nominal first shot duration value and a cylinder first shot duration trim value, said controller being operable to leave the initial fuel injection event unchanged if a predetermined first shot advance value is greater than or equal to a predetermined cylinder first shot duration value, and said first shot advance value is greater than or equal to said desired minimum delay value, and a difference between said first shot advance value and said cylinder first shot duration value is greater than said desired minimum delay value.

37. The fuel injection control system as set forth in claim 31 wherein said fuel injection event includes at least a pilot shot and a main shot, said first fuel shot being said pilot shot and said second fuel shot being said main shot.

38. The fuel injection control system as set forth in claim 37 wherein said fuel injection event also includes an anchor shot.

39. A method for controlling a fuel injection event for an engine comprising the steps of:
determining a speed of the engine;
determining an initial fuel injection event based upon said determined speed, said initial fuel injection event having a first shot, a second shot, and an expected delay between said first and second shots;
establishing a desired minimum delay between said first and second shots based upon said determined engine speed;
comparing said desired minimum delay with said determined expected delay between said first and second shots; and
modifying said initial fuel injection event in response to said expected delay being less than said desired delay.

40. The method set forth in claim 39 further comprising the step of outputting a signal indicative of said modified fuel injection event.

41. The method set forth in claim 39 including setting a marker bit associated with a cylinder in the engine based upon said desired fuel injection event.

42. The method set forth in claim 41 wherein said marker bit is set if said initial delay between said first and second shots is less than said desired minimum delay.

43. The method set forth in claim 39 further including the step of modifying said initial fuel injection event by removing a portion of said first fuel shot that overlaps into a predetermined region of said fuel injection event.

44. The method set forth in claim 39 further including the steps of:
determining a cylinder first shot duration value by adding a nominal first shot duration value and a first shot duration trim value;
leaving the initial fuel injection event unchanged if a predetermined first shot advance value is greater than or equal to a predetermined cylinder first shot duration value, and said first shot advance value is greater than or equal to said desired minimum delay value, and a difference between said first shot advance value and said cylinder first shot duration value is greater than said desired minimum delay value.

* * * * *

UNITED STATES PATENT AND TRADEMARK OFFICE
CERTIFICATE OF CORRECTION

PATENT NO. : 6,450,149 B1  Page 1 of 1
DATED : September 17, 2002
INVENTOR(S) : Brian G. McGee It is certified that error appears in the above-identified patent and that said Letters Patent is hereby corrected as shown below:

<u>Title page,</u>
Item [57], ABSTRACT,
Lines 14-22, delete "The controller is further operable to either remove a portion of the first fuel shot that overlaps into a predetermined region of the particular fuel injection event or set the first fuel shot duration time to zero if it determines that a potential overlap situation will occur. The controller is further operable to load the cylinder first shot duration time thus determined for each cylinder in a computer readable medium associated with the respective cylinder during each fuel injection event."

Signed and Sealed this

Eleventh Day of February, 2003

JAMES E. ROGAN
*Director of the United States Patent and Trademark Office*